(12) United States Patent
Groeschel et al.

(10) Patent No.: US 6,421,664 B1
(45) Date of Patent: Jul. 16, 2002

(54) APPARATUS, PROGRAM PRODUCT AND METHOD FOR ESTIMATING THE NUMBER OF KEYS WITHIN AN INDEX KEY RANGE

(75) Inventors: Micahel John Groeschel, Hampton; Scott Dennis Helt; Rebecca Nan Brady Legler, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/334,543

(22) Filed: Jun. 16, 1999

(51) Int. Cl.[7] ............................................... G06F 17/30
(52) U.S. Cl. .............................. 707/3; 707/2; 707/101
(58) Field of Search ............................... 707/2, 3, 101

(56) References Cited

U.S. PATENT DOCUMENTS

| | | | |
|---|---|---|---|
| 4,774,657 A | | 9/1988 | Anderson et al. ............... 707/2 |
| 5,446,887 A | * | 8/1995 | Berkowitz ................... 707/101 |
| 5,522,068 A | * | 5/1996 | Berkowitz ................... 707/101 |
| 5,918,225 A | * | 6/1999 | White et al. ..................... 707/3 |

* cited by examiner

Primary Examiner—Diane D. Mizrahi
(74) Attorney, Agent, or Firm—Wood, Herron & Evans

(57) ABSTRACT

An apparatus, program product and method for estimating the number of keys within an index key range over an index using page pointers to pages in the index comprises a program configured for scanning the index, from a divergence point of the key range, until a page pointer is found and incrementing a counter for each found page pointer. The program is further configured for determining if the page pointer points to a leaf page in the index, and if it does, continuing the scan to find the next page pointer without going to the corresponding leaf page. Otherwise, the program continues the scan to find the next page pointer and continues the scan for page pointers and increments the counter until the index is scanned for the entire key range. Upon completion of the scan, the program determines an estimate of the number of keys utilizing the counter.

22 Claims, 4 Drawing Sheets

US 6,421,664 B1

APPARATUS, PROGRAM PRODUCT AND METHOD FOR ESTIMATING THE NUMBER OF KEYS WITHIN AN INDEX KEY RANGE

FIELD OF THE INVENTION

This invention relates generally to data management, and particularly to management of data within an index tree.

BACKGROUND OF THE INVENTION

Binary radix trees are known structures for arranging data within a computer system. Binary radix trees of data are indexed, and an index tree comprises a plurality of elements, including decision nodes which are used to direct a search through the index tree to find the desired data. The desired data within a binary radix tree may be accessed with one or more key values or keys which define the path to data within the index. For example, decision nodes in an index tree use the keys to define the way that a search through an index will progress. Ranges of keys designated by key endpoints are often utilized in searching a binary radix tree for database management applications. Such ranges of keys contain a specific number of keys, and database management applications rely on the accuracy of that number for efficient operation.

The blocks of data of a binary radix tree, and specifically the index elements of the tree, are grouped in units referred to as "logical pages". Therefore, to search an index according to key values, various pages must be searched. The index element used to link the various pages of an index together is referred to as a page pointer. Specifically, data and index elements within an index tree are segmented into logical pages, which will generally determine the size of physical I/Os. When a set of index elements is too large to fit within a single logical page, some of the data is split off to a new page, and it is replaced with a page pointer element which points to the new page. Those pages which do not include any page pointers to additional pages are referred to as leaf pages. Those pages which do include page pointers to additional pages are referred to as non-leaf pages or limb pages within an index tree.

Database management applications utilize a number of operations, such as Query and Join operations. When such operations are performed on a database, pages of data are accessed, and decisions have to be made with respect to the most efficient ways to perform the operations in regards to the particular index of a database and with respect to the range of key values to be utilized in the operation. If all of the pages to be searched for an operation are resident in fast access memory, such as the local RAM of a computer, searching an index key range is very efficient. However, not all of the pages of the index will typically be in the local RAM. Local memory is generally constrained such that it is not large enough to contain all of the pages of data in binary radix trees; therefore, the vast majority of the data is maintained within an external storage medium, such as on an external disk. The pages for the database operation therefore must be retrieved from the external storage and placed in the fast access RAM for database operations. Since significant time is required to retrieve the pages from external storage, it is desirable with respect to a particular database operation to determine how much data within a binary radix tree is needed and how many keys (and associated pages) are within a defined range for the particular operation, in order to optimize the operation.

Within a binary radix tree, the majority of data pages lie at the lowest level of the tree and are leaf pages. The other pages are non-leaf pages, such as limb pages and, ultimately, a trunk. Most index keys terminate on leaf pages. Within a database operation, a range of keys within the index tree might be designated for the operation as noted. Therefore, determining the number of keys within a key range for a particular database operation has required the step of retrieving large quantities of data pages, and particularly leaf pages, from external storage. Thus, such an operation has been significantly time consuming.

Attempts have been made to reduce the time for database management operations by estimating the number of keys within a key range indicated for an index and then performing the database management operation based on such an index key range estimate. For example, U.S. Pat. No. 4,774,657, which is commonly owned with the present application, provides one way of making an index key range estimation which eliminates having to retrieve and search all the pages containing keys within a specified key range. U.S. Pat. No. 4,774,657 is hereby incorporated herein by reference in its entirety. That patent makes an estimate of the number keys in a binary radix tree key range, such as to be processed for a particular Join or Query operation, as a function of the number of pages referenced but not retrieved during a level limited search within the index. In the patent, a key range of an index is defined by designating endpoint keys. The index is then searched down to the lowest level indicated by one of the endpoint keys. Knowing the lowest level of a range endpoint, a level limit is then calculated, and the estimation is based upon searching down to that level limit to determine the number of pages that were referenced. The number of pages referenced is then multiplied by the average key density per page for the whole index and the number of keys within the range is then calculated as an estimate.

While U.S. Pat. No. 4,774,657 has various valuable aspects with respect to database management optimization, the estimation routine assumes a balanced index tree wherein the depth of the leaf pages within the index tree does not vary significantly. However, the depth of leaf pages within the index may vary significantly, especially within binary radix trees. Therefore, utilizing the method of U.S. Pat. No. 4,774,657 can sometimes lead to lower and inaccurate key range estimates when the depth of part of the tree is deeper than expected. When the depth of the tree is shallower than expected, the estimator may fault in leaf pages unnecessarily. As a result, Query performance and other database operations can be degraded.

Accordingly, there is a need for further improvements within database management of a binary radix tree index for improved database management operations.

There is further a need for an improvement which takes into account the possible imbalance of the depth of the tree for more accurate key range estimates and thus more optimal performance of the desired database management operations.

The present invention addresses those needs in the prior art and other needs, and provides an improved key range estimator for binary radix trees, as discussed and disclosed further herein below.

SUMMARY OF THE INVENTION

The present invention addresses the above-objects by scanning an index into a page pointer is found and incrementing a counter for each page pointer, but not going to the corresponding leaf if the pointer is a leaf page pointer. Specifically, an apparatus, program product and method for estimating the number of keys within an index key range comprises the step of defining a left end point and a right end point of the key range and finding the point of the index in which the pass to the left and right end points diverge. Starting at the divergent point, a scan is made of the index until a page pointer is found, and a counter is incremented for each page pointer that is found. A determination is then made to see if the page pointer points to a leaf page or if it points to a non-leaf page within the index. If the page pointer points to a leaf page within the index, the scan is continued to find the next page pointer without going to the corresponding leaf page. Otherwise, if the page pointer points to a non-leaf page, the scan is continued to find the next page pointer, such as by going to the non-leaf page. The incrementing of the counter continues for each page pointer that is found, and the scan continues without going to any leaf pages. The index is scanned for the entire key range. After the scan is complete, a determination is made of an estimated number of keys utilizing the counter value.

In accordance with one embodiment of the invention, the estimate number of keys is made by multiplying the average number of keys per page for the index by the amount of the counter.

In another embodiment of the invention, the method of determining whether the page pointer points to a leaf page or a non-leaf page is made by maintaining an indicator within the page pointer and then checking the indicator to determine its status. Specifically, a leaf indicator bit might be utilized within the page pointer and the status of the bit is checked to determine whether the page pointer points to a non-leaf page or a leaf page.

When a page pointer for a non-leaf page is encountered, the scan will generally continue by eventually going to the non-leaf page which corresponds to that page pointer. In accordance with one aspect of the present invention, in order to more efficiently scan the index, a scan ahead is made in the index to find a second non-leaf page pointer. If a second non-leaf page pointer is found, the non-leaf page corresponding to the second non-leaf page pointer is asynchronously brought into local memory from external storage while the scan proceeds to the non-leaf page corresponding to the first non-leaf page pointer. In that way, the program will often already have subsequent non-leaf pages in local memory for rapid access as the scan continues.

The various features of the invention and other features will become readily apparent from the detailed description of the invention herein below.

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

DETAILED DESCRIPTION

The embodiments of the invention described herein are directed to estimating the number of keys within an index key range for a binary radix tree, such as for the purposes of optimization of database management operations. To that end, and beginning at the node where the paths to the low key and high key diverge, the scan of a tree is made until a page pointer is found. Each page pointer is counted as it is found. A determination is then made with respect to whether the found page pointer points to a leaf page or a non-leaf page. If the page pointer points to a leaf page, the scan is continued without following the page pointer and scanning the leaf page. The scan will then continue until it finds the next page pointer. If the page pointer points to a non-leaf page, the pointer is followed to the respective non-leaf page, and the non-leaf page is scanned as the scan continues. Therefore, the present invention effectively counts all the page pointers within an index tree without actually scanning leaf pages. That is, the scan continues right down to the leaf pages but does not include the leaf pages. Since the non-scanned leaf pages make up a significant portion of the data within an index tree, the program may efficiently, yet accurately, count the pages, providing a key estimate for the index key range. With the page count, the key estimate is determined by multiplying that count with the average number of keys per page. In one embodiment of the invention, when a non-leaf page is found, a scan ahead is made of the tree to find another non-leaf page pointer, and the non-leaf page referred to by the other non-leaf page pointer is asynchronously brought into the fast access memory from external storage in anticipation of a subsequent scan of that page. In that way, the efficiency of the invention is further enhanced.

Hardware and Software Environment

Figure 1:
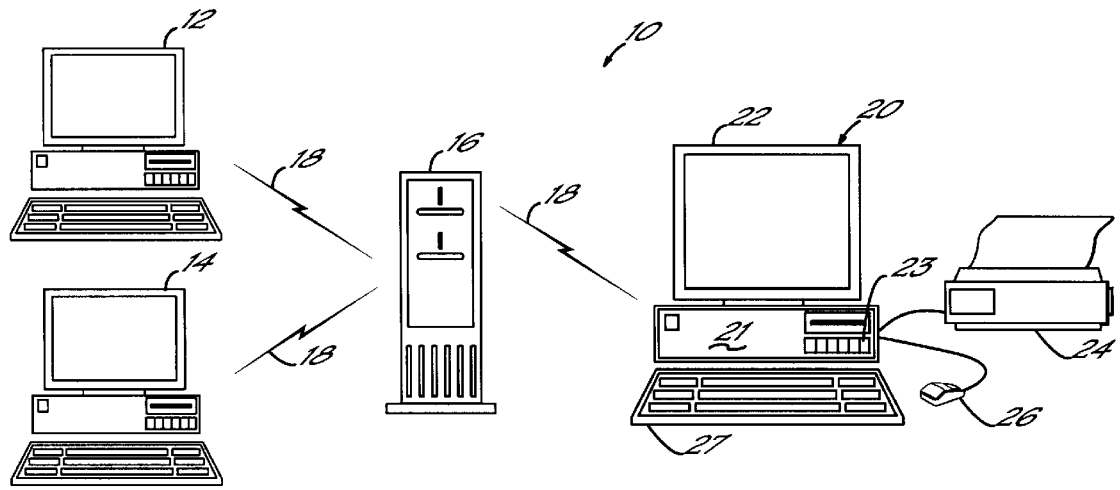
FIG. 1 is a block diagram of a networked computer system consistent with the invention.

Turning to the figures, wherein like numbers denote like parts throughout the several views, FIG. 1 illustrates a computer system 10 consistent with the invention. Computer system 10 is illustrated as a networked computer system including one or more client or remote computers 12, 14 and 20 (e.g., desktop or PC-based computers, workstations, etc.) coupled to server 16 (e.g., a PC-based server, a minicomputer, a midrange computer, a mainframe computer, etc.) through a network 18. Server 16 may serve as the monitoring computer of the invention in one embodiment. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client or remote computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured as computer 20, albeit typically with greater processing performance and storage capacity, as is well known in the art.

Figure 2:
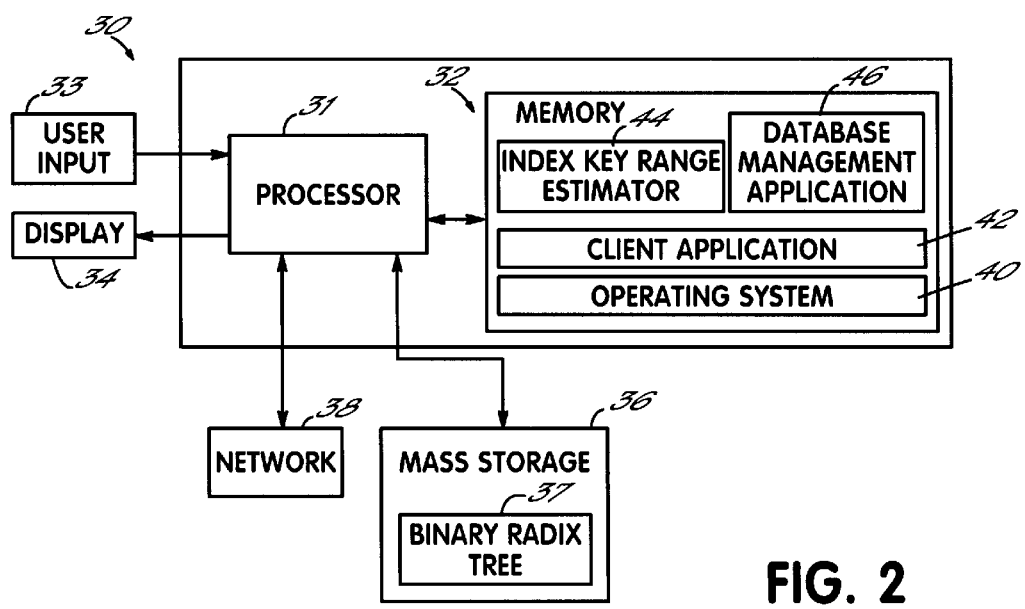
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client or remote computer (e.g., similar to computers 12, 14 and 20 of FIG. 1), a server computer (e.g., similar to server 16 of FIG. 1), a portable or palm computer, an embedded controller, etc. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) or other local memory devices comprising the main storage or rapid access memory of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, using a server such as server 16, direct user input and output may not be supported by the computer.

For additional storage, computer 30 will usually also include one or more external mass storage devices 36, e.g., a floppy or other removable disk drive, a hard disk drive, a direct access storage device (DASD), an optical drive (e.g., a CD drive, a DVD drive, etc.), and/or a tape drive, among others. In accordance with one aspect of the present invention, databases to be managed might be stored in external mass storage 36, such as on an external disk. In such a situation, it will be undesirable to access every page or block of data for a particular database management operation because of the significant time required to access the external storage. For example, a database may be in the form of a binary radix tree 37 or other structure, which is located in the external storage 36. The pages or other blocks of data to be utilized in a particular operation must be retrieved from external storage and placed in the local memory 32, which will generally be too small to contain all of the data of the database. The present invention insures that only the required pages of tree 37 will ever be retrieved from external storage and thereby improves the speed and efficiency of database management operations. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., client application 42 and an Index Key Range Estimator application 44 or Database Management application 46, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Index Key Range Estimator

Figure 3:
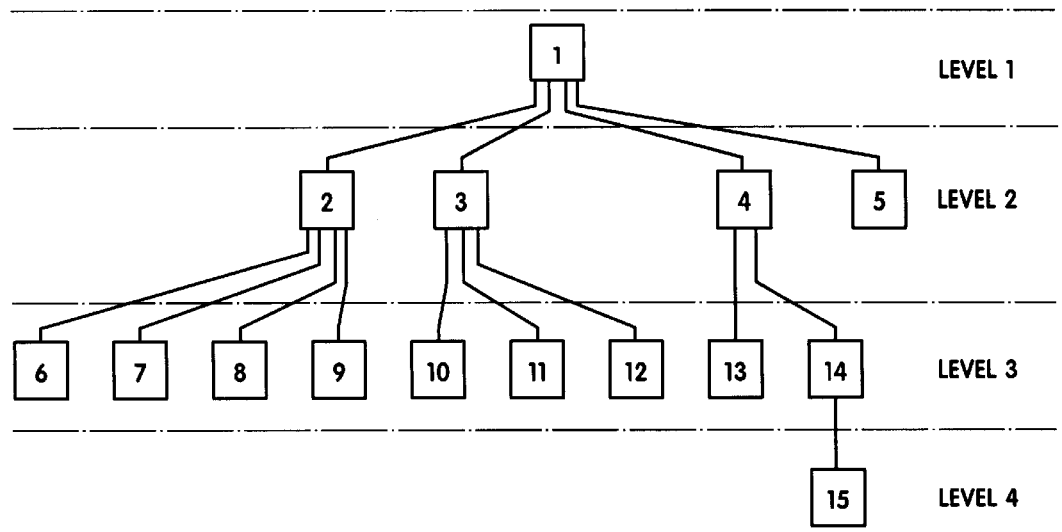
FIG. 3 is a block diagram representation of pages in a binary radix tree covering a data space.

FIG. 3 is a representation of a binary radix tree which will be used to demonstrate operation of one embodiment of the index key estimator. Lines indicate logical connections between pages in the index, such as page pointers and back pointers. Pages in the index are numbered 1 through 15 with page 1 being located on the first level, pages 2–5 on the second level, pages 6–14 on the third level and page 15 on the fourth level. The single page, page 1 at level one, is referred to as the trunk or trunk page. Pages which have no logical connections to any higher numbered levels are referred to as leaf pages. pages 5–13 and 15 are leaf pages. The remainder of the pages, pages which connect the trunk with the leaf pages, are referred to as limb pages. Pages 2–4 and 14 are limb pages.

Figure 4:
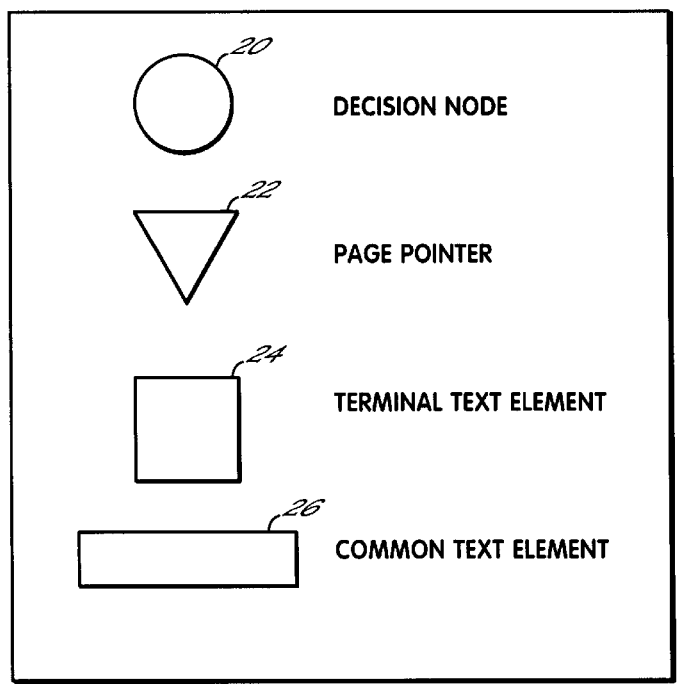
FIG. 4 is a diagram of symbols used to indicate various elements of an index tree in accordance with one example of the invention.

Each page of the index contains one or more of the following index elements, shown in FIG. 4. Decision nodes, represented by the symbol 20, define the direction (i.e., to the right or to the left) in which a search should proceed through the index based on the value of certain bits of a key being searched. Each decision node contains forward and backward linkage information. They also contain information defining the type of node as a decision node, and identify a compare bit offset which is tested in the desired key to provide search direction (e.g., if the specified bit in the key is zero, the search proceeds left; if the bit is one, the search proceeds right). Page pointers, represented by the symbol 22, are index elements which contain reference to the next logical page in a search path. When a page pointer is encountered in a scan, if the page it addresses is not resident in fast access or main storage, such as the local RAM of a computer, the referenced page must be brought (retrieved) from remote or external storage, such as an external tape or disk, into the main storage. Common text elements, indicated as 26, contain text common to the beginning of more than one entry. Terminal text elements 24 contain the remaining part of an entry or key stored in the index. Certain index elements and page structures are described in further detail in U.S. Pat. No. 4,774,657. Binary radix trees are related to B-trees and the invention described herein is applicable to implementation of binary trees, B-trees and other n-ary trees.

Figure 5:
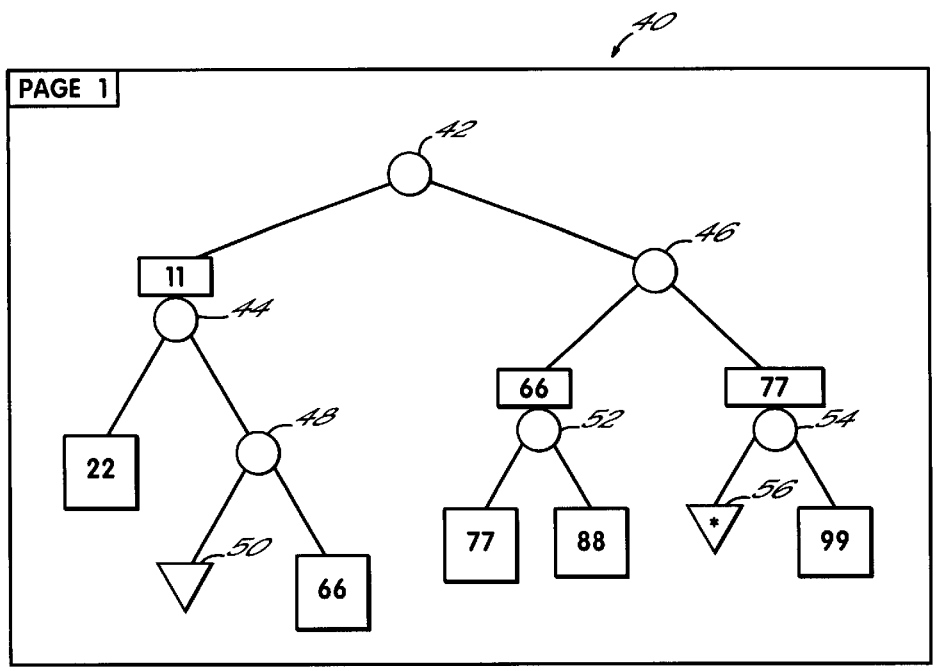
FIG. 5 is a schematic diagram of a logical page of an index tree in accordance with one example of the present invention.

FIG. 5 illustrates one particular logical page 40 of a binary radix tree and is designated as page 1 for the purposes of the description of the invention. During a search of the index tree, such as for the purposes of estimating the number of keys within a designated key range, each page might typically be searched from node to node until the particular key is found for a designated range. For example, referring to page 1 and FIG. 5, the decision node 42 might be reached and based upon the bit values within a particular key which is being searched, a decision will be made to go left to decision node 44 or right to decision node 46. Decision node 44 is also associated with a common text element with number "11". The example, as set forth in U.S. Pat. No. 4,774,657, utilizes animal sounds as particular keys within a key range. The current figures and example herein utilize four digit numbers, which might be considered employee numbers, for example, to illustrate the present invention. Decision node 44 linked with common text element "11" will require an additional decision to go left to a terminal text element of number "22" or right to another decision node 48. Similarly, decision node 48 is linked to a page pointer 50 and another terminal text element with number "66". If the search had proceeded right at decision node 42, the decision node 46 would have led to decision node 52 with common text element containing number "66" and then to terminal text elements containing numbers "88" and "77". Decision node 54, associated with the common text element, including "77", would lead to an additional page pointer 56 and the terminal text element with number "99". Searching the entire page 1 would lead to the key entries or four digit employee numbers 1122, 1166, 6688, 6677 and 7799. Furthermore, the search would be linked to additional pages through the page pointers 50 and 56.

Figure 6:
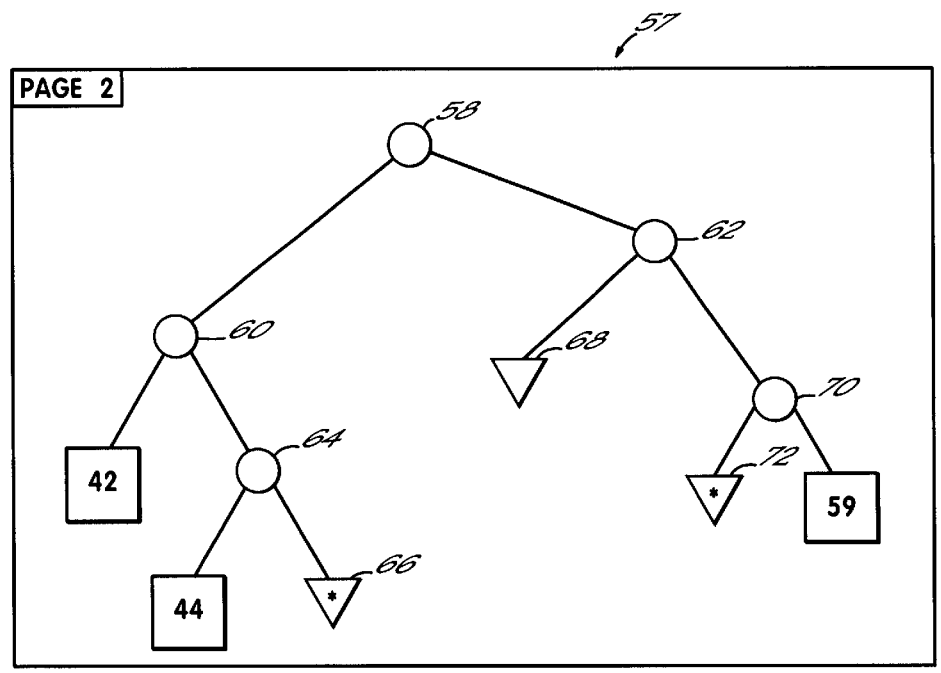
FIG. 6 is a schematic diagram of another logical page similar to FIG. 5 in accordance with the present invention.

For example, page pointer 50 might point to page 2 illustrated in FIG. 6. Page 2 is initiated through a decision node 58 which leads left to another decision node 60 or right to decision node 62. Through decision node 60, a terminal text node with number "42" or decision node 64 is reached, leading to a terminal text node with "44" and page pointer 66. Decision node 62 leads to a page pointer 68, and decision node 70. Decision node 70 then leads to another page pointer, 72, and a common text element including number "59". The various page pointers 50, 56, 66, 68 and 72 may lead to non-leaf pages, that is pages which have logical connections to higher numbered levels as illustrated in FIG. 3. For example, page pointer 50 points to page 2 designated with reference numeral 57, which, in turn, includes other page pointers which point to other pages and higher numbered levels within the tree. Accordingly, page pointer 50 is considered a non-leaf pointer. However, other page pointers, such as pointers 56, 66 and 72, may point to pages (not shown) which do not include any additional page pointers, but rather only include decision nodes and common and terminal text elements. Such pages which do not lead to further levels in the tree are referred to as leaf pages. Therefore, page pointers 56, 66 and 72, for illustration purposes, are leaf page pointers. The leaf page pointers within FIGS. 5 and 6 are set forth with asterisks therein to indicate that they point to leaf pages.

An example is helpful in illustrating the features of the present invention. It may be desirable to scan a binary radix tree with an index key range of employee number keys for a group of employees. Performing a database management operation such as a Join or Query, it may be desirable to determine or estimate the number of keys within a defined index key range before the operation is executed to determine how to most efficiently perform the operation. For example, if the number of keys corresponding to a particular employee number key range is too high, another index and key range might be chosen to process a group of employees in a database. The present invention determines the number of pages to be accessed for the keys within a defined range, such as an employee number range between 1,000 and 8,000, and then the invention provides the number of keys in the range utilizing an average key per page number for the index. In accordance with one aspect of the present invention, the invention determines whether a page found in a scan is a non-leaf page or a leaf page. If it is a leaf page, the page is counted but otherwise ignored, and the scan continues without obtaining the leaf page from mass storage and scanning that leaf page. That is, the invention will scan up to but will not include the various leaf pages, but will thereby take those leaf pages into account for the purposes of an estimate. This is a significant improvement over the prior art which defined a level limit of the scan based upon assumptions regarding the binary radix tree and the overall balance in composition of the tree.

Figure 7:
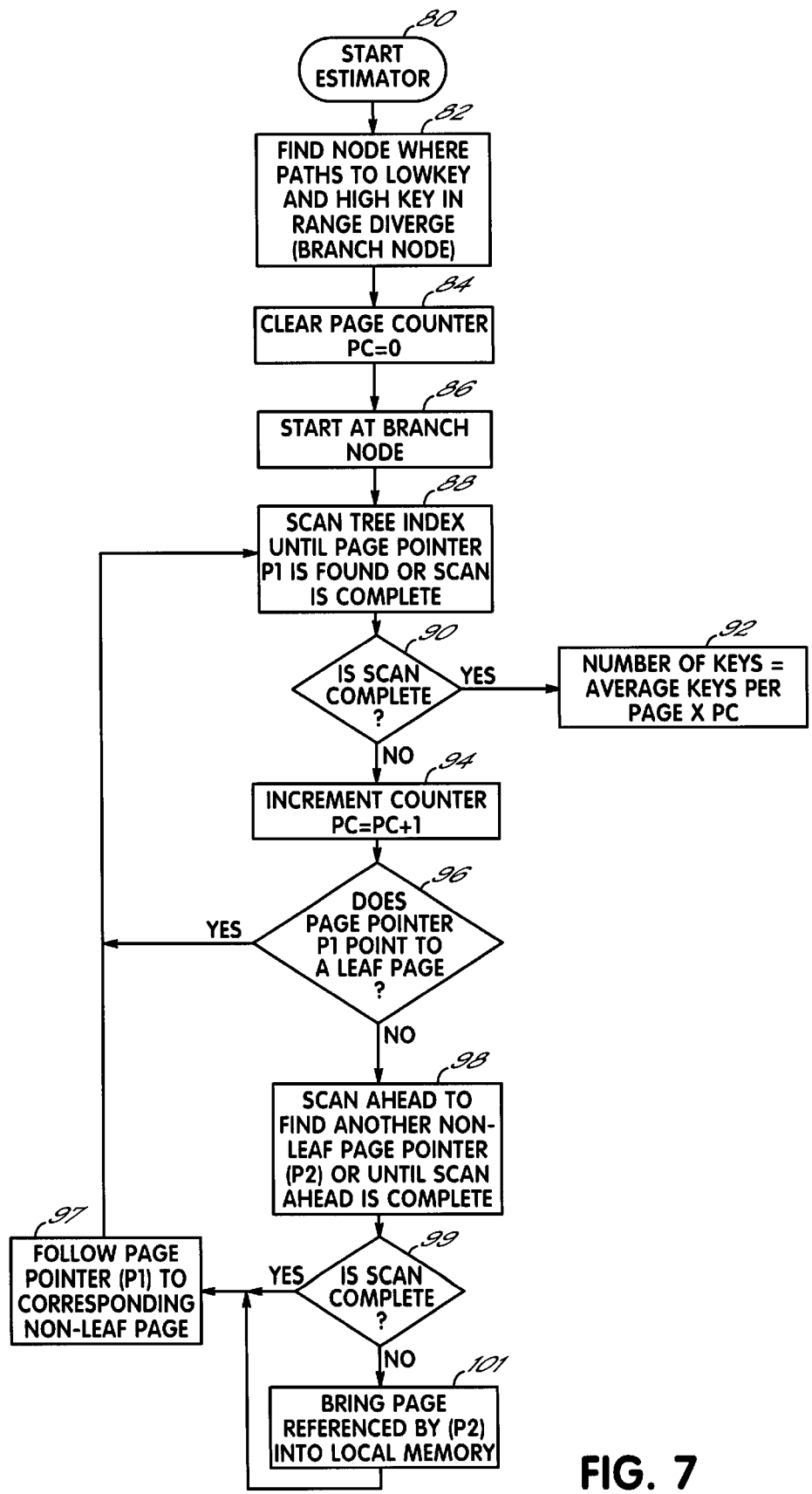
FIG. 7 is a flowchart illustrating the program flow of a program in accordance with the present invention.

Turning now to FIG. 7, a flowchart for one embodiment of the invention is illustrated. The flow chart will be described with respect to the pages illustrated in FIGS. 5 and 6; however, it will be understood by the person of ordinary skill in the art that a binary radix tree will usually include a significantly larger number of pages than the two shown in FIGS. 5 and 6. When the estimator program of the invention is initiated (box 80), the designated low key endpoint and high key endpoint of the index key range are utilized to find a starting point for the estimator program. For example, in an index key range of employee numbers between 1,000 and 8,000, with respect to pages 1 and 2 shown in FIGS. 5 and 6 and the key entries therein, the low endpoint key is 1122 which may be found by scanning to the left of decision node 42. The high endpoint key is 7799 which is found by scanning to the right of the decision node 42. Accordingly, for the purposes of the example described herein, the node where the paths to the low and high endpoint keys diverge is node 42. Referring to FIG. 7, the node where the paths to the low endpoint key and high endpoint key specified in the key range diverge is named the branch node (block 82). Once the branch node is found, a counter is initialized (block 84), and the scan begins at the branch node (block 86). That is, for the example described herein, the scan to determine an estimate for the number of keys within a designated key range begins at node 42 as shown in FIG. 5. Assuming that this scan would begin to the left of node 42 and proceed right, the tree index is scanned until a page pointer P1 is found or the scan is complete (block 88). That is, the scan will continue until a page pointer is found or a complete scan of the tree index has been made. Referring to FIG. 5, the scan will stop upon finding the page pointer 50 which is designated as the current P1 with respect to the flowchart in FIG. 7. Upon stoppage of the scan, the test is made to determine whether the scan is completed or whether a page pointer w as found. If the scan was completed, the number of key s is determined according to block 92 by multiplying the average keys which would exist for a page in the database by a count value within a counter (i.e., PC). As set forth hereinbelow, the counter value PC is incremented for each page pointer found during the scan. The average number of keys per page is a value which is obtained by simply dividing the number of keys within the index by the number of pages of the index. If the scan was not completed, but rather the page pointer P1 was found, the counter is incremented (i.e., PC=PC+1) as shown by block 94.

When a current page pointer P1 (pointer 50) has been found, a determination is made as to whether the page pointer points to a leaf page. In accordance with one aspect of the present invention, the scan proceeds up to but not including leaf pages. To that end, the present invention determines if the page pointer points to a leaf page or a non-leaf page in the index. In accordance with one embodiment of the invention, the indication of whether a page pointer points to a leaf page or a non-leaf page is maintained in the form of a leaf indicator bit within the page pointer.

Figure 8:
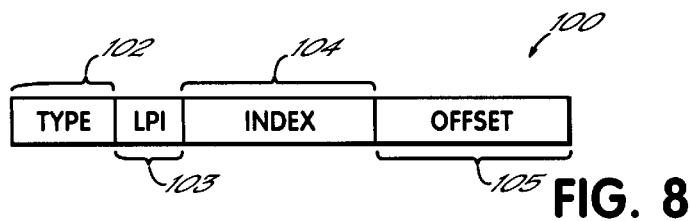
FIG. 8 is a diagram illustrating the logical construction of a page pointer element in accordance with one example of the present invention.

FIG. 8 illustrates the arrangement of a 4 byte (32 bit) representation of a page pointer element to be utilized with the present invention. Page pointer node 100 includes a type field 102 wherein the bit values "11" indicate a page pointer type element. A seventeen bit index field 104 of the page pointer is an index to a segment table which includes a segment of the storage or memory containing the desired page which is pointed to by the pointer node 100. Such segment tables are known in the art. A twelve bit page offset field 105 identifies the specific page number of a new page within a containing segment of the storage designated by field 104. Such page offset fields 105 are also known in the art. In the example described herein, the leaf page indicator field 103 or LPI is a single bit field. As an example, if the bit is on, the page pointer element is indicated as a page pointer which points to a non-leaf page. If the bit is on, page pointer 100 points to a leaf page. Of course, vice versa may be true. In one embodiment of the invention, the determination of whether a page pointer points to a leaf page or a non-leaf page is made by checking the bit in the leaf page indicator field 103. While a 4 byte element as shown in FIG. 8 is described, the page pointer may be larger or smaller as long as it contains at least one bit for field 103. Field 103 might also be multiple bits.

Utilizing the leaf page indicator 103, the status of a leaf page as a leaf page or a non-leaf page can be determined without referencing any other data, and particularly without faulting in the actual page to determine whether it includes additional page pointers (that is, a non-leaf page) or has no page pointers (that is, a leaf page). As noted, each page pointer contains a leaf indicator bit, or a field 103, which denotes the status of the referenced page as being a leaf page or a non-leaf page. The leaf page indicator bit or field 103 is regularly updated within the database whenever the page that is being referenced by the page pointer changes state from a leaf page to a non-leaf page or vice versa.

That is, whenever the page referenced by a page pointer becomes a non-leaf page which points to other pages, the field 103 is modified to indicate that the page pointer points to a non-leaf page. To indicate within a page pointer whether the corresponding page, which is being referenced or pointed is a leaf page or a non-leaf page, the header of the corresponding pointed page is monitored. Particularly the number of page pointers within that corresponding pointed page is monitored. The number of page pointers that exist in a page is tracked in the header of the page by a counter. Whenever the count of the page pointers within a page header makes a transition from 0 to 1 or vice versa, i.e., whenever the page takes on its first page pointer and thereby becomes a non-leaf page or loses its last page pointer and thereby becomes a leaf page, the leaf page indicator field 103 within the page pointer for that corresponding page is updated to indicate that the corresponding page that is pointed to by the page pointer is either a leaf page or a non-leaf page. In short, if a page pointer points to a page that has a pointer count equal to 0, then that page is a leaf page and will be indicated as such by the leaf page indicator field 103 of the pointer. If the pointer count is greater than 0, then the page is a non-leaf page and will be so indicated within the leaf page indicator field 103.

Returning now to FIG. 7, upon finding a current page pointer P1, the counter is incremented (block 94). A determination is made according to block 96 as to whether the page pointer P1 points to a leaf page or a non-leaf page. For example, field 103 of the page pointer is examined. If the pointer P1 points to a leaf page, the scan is continued to find the next page pointer without going to the corresponding leaf page. In that way, no leaf pages are faulted into local memory from external storage, but the status of those pages is nonetheless still accounted for by the counter. The counter PC therefore includes all relevant pages and does not stop at a predefined limit as is done in the prior art.

The program then scans ahead to either find another non-leaf page pointer (P2) or until the scan ahead is completed without finding another non-leaf page pointer (block 98). A determination is made to see if the scan ahead was stopped because the scan was completed (block 99). If it was, the program continues, following page pointer (P1) to the corresponding non-leaf page (block 97) to continue the scan as discussed above. If the scan was not complete and another non-leaf page pointer (P2) was found, the non-leaf page corresponding to the page pointer (P2) or referenced by (P2) is brought asynchronously into local memory from external storage (block 101), as that page will likely be the next non-leaf page to be processed within the scan. In that way, the program is more efficient and will often already have the next non-leaf page in local memory for rapid access as the scan continues to find additional page pointers. The scan for page pointers continues until it is complete (block 90). Upon completion of the scan, the counter value PC is utilized for determining an estimate of the number of keys (block 92). Specifically the value of the counter PC (i.e., the number of pages) is multiplied by the average number of keys per page. In that way, the estimator program determines an estimate of the keys within a particular index key range.

Accordingly, the present invention provides a useful estimate of the number of keys in the range which might be utilized for further database operations, such as Query and Join. The invention takes in account the possible imbalance in the depth of the tree and provides a more accurate key range estimate than possible with the prior art methodologies. Accordingly, desired database management operations are more accurate and more efficient. No arbitrary scan level limit is utilized, but at the same time, the invention avoids faulting in any leaf pages which account for a significant majority of the pages in a binary radix tree. While the leaf pages are not faulted into the local memory from external main storage, those leaf pages are still taken into account in the estimate, thus making the estimate more accurate for a variety of different trees whether balanced or imbalanced.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

What is claimed is:

1. A computer-implemented method of performing database operations utilizing an estimation of the number of keys within a key range over an index wherein the index includes page pointers to pages in the index, the method comprising
   (a) defining a left endpoint and a right endpoint of the key range and finding the point in the index at which the paths to the left and right endpoints diverge;
   (b) starting at the divergence point, scanning the index until a page pointer is found;
   (c) incrementing a counter for each page pointer that is found;
   (d) determining if the page pointer points to a leaf page or a non-leaf page in the index;
   (e) if the page pointer points to a leaf page in the index, continuing scanning to find the next page pointer without going to the corresponding leaf page, otherwise continuing scanning to find the next page pointer;
   (f) repeating steps (c), (d) and (e) above until the index is scanned for the entire key range;
   (g) after scanning is complete, determining an estimate of the number of keys utilizing the counter and performing a database operation using the estimate.

2. The method of claim 1 further comprising determining an estimate of the number of keys by multiplying the average number of keys per page in the index by the amount of the counter.

3. The method of claim 1 further comprising:
   (a) maintaining an indicator in the page pointers which indicates whether a page pointed to by the pointers is a leaf page or a non-leaf page; and
   (b) determining if the page pointer points to a leaf page in the index by checking the indicator.

4. The method of claim 3 wherein said indicator is in the form of a leaf indicator bit in the page pointer.

5. The method of claim 1 further comprising:
   (a) if the page pointer points to a non-leaf page in the index, following the non-leaf page pointer to a corresponding non-leaf page; and
   (b) continuing scanning to find the next page pointer from that corresponding non-leaf page.

6. The method of claim 1 further comprising:
   (a) if the page pointer points to a non-leaf page in the index, scanning ahead in the index to find another non-leaf page pointer;
   (b) if another non-leaf page pointer is found, retrieving the non-leaf page corresponding to the another non-leaf page pointer.

7. The method of claim 6 further comprising:
   (a) simultaneously with retrieving the non-leaf page corresponding to the another non-leaf page pointer, if the page pointer points to a non-leaf page in the index, following the non-leaf page pointer to a corresponding non-leaf page; and
   (b) continuing scanning to find the next page pointer from the corresponding non-leaf page.

8. The method of claim 6 wherein the retrieved non-leaf page is placed in local memory for easy access.

9. An apparatus for estimating the number of keys within a key range over an index using page pointers to pages in the index, the apparatus comprising:
   (a) a memory; and
   (b) a program resident in the memory, the program configured for scanning the index, from a divergence point of the key range, until a page pointer is found and incrementing a counter for each found page pointer, and further configured for determining if the page pointer points to a leaf page in the index, and if it does, continuing scanning to find the next page pointer without going to the corresponding leaf page, otherwise continuing scanning to find the next page pointer and continuing scanning for page pointers and counter incrementing until the index is scanned for the entire key range, upon completion of the scanning, the program determining an estimate of the number of keys utilizing the counter.

10. The apparatus of claim 9 wherein the program is configured for determining an estimate of the number of keys by multiplying the average number of keys per page in the index by the amount of the counter.

11. The apparatus of claim 9 wherein the program is further configured for maintaining an indicator in the page pointers which indicates whether a page pointed to by the pointers is a leaf page or a non-leaf page, and for determining if the page pointer points to a leaf page in the index by checking the indicator.

12. The apparatus of claim 11 wherein said indicator is in the form of a leaf indicator bit in the page pointer.

13. The apparatus of claim 9 wherein the program is further configured, if the page pointer points to a non-leaf page in the index, for following the non-leaf page pointer to a corresponding non-leaf page, and continuing scanning to find the next page pointer from the corresponding non-leaf page.

14. The apparatus of claim 9 wherein the program is further configured, if the page pointer points to a first non-leaf page in the index, for scanning ahead in the index to find a second non-leaf page pointer, and if a second non-leaf page pointer is found, for retrieving the non-leaf page corresponding to the second non-leaf page pointer.

15. The apparatus of claim 14 wherein the program is further configured for, simultaneously with retrieving the non-leaf page corresponding to the second non-leaf page pointer, following the first non-leaf page pointer to a corresponding non-leaf page, and continuing scanning to find the next page pointer from that corresponding non-leaf page.

16. The apparatus of claim 15 wherein the program places the retrieved non-leaf page in local memory for easy access.

17. A program product for estimating the number of keys within a key range over an index using page pointers to pages in the index, the program product comprising:

(a) a program configured for scanning the index, from a divergence point of the key range, until a page pointer is found and incrementing a counter for each found page pointer, and further configured for determining if the page pointer points to a leaf page in the index, and if it does, continuing scanning to find the next page pointer without going to the corresponding leaf page, otherwise continuing scanning to find the next page pointer and continuing scanning for page pointers and counter incrementing until the index is scanned for the entire key range, upon completion of scanning, the program determining an estimate of the number of keys utilizing the counter;

(b) a signal bearing media bearing the program.

18. The program product of claim 17 wherein the signal bearing media comprises at least one of a recordable media and a transmission type media.

19. The program product of claim 17 wherein the program is further configured for maintaining an indicator in the page pointers of the index which indicates whether a page pointed to by the pointers is a leaf page or a non-leaf page, and for determining if the page pointer points to a leaf page in the index by checking the indicator.

20. The program product of claim 17 wherein the program is further configured, if the page pointer points to a non-leaf page in the index, for following the non-leaf page pointer to a corresponding non-leaf page, and continuing scanning to find the next page pointer from the corresponding non-leaf page.

21. The apparatus of claim 17 wherein the program is further configured, if the page pointer points to a first non-leaf page in the index, for scanning ahead in the index to find a second non-leaf page pointer, and if a second non-leaf page pointer is found, for retrieving the non-leaf page corresponding to the second non-leaf page pointer.

22. The program product of claim 21 wherein the program is further configured for, simultaneously with retrieving the non-leaf page corresponding to the second non-leaf page pointer, following the first non-leaf page pointer to a corresponding non-leaf page, and continuing scanning to find the next page pointer from that corresponding non-leaf page.

* * * * *

UNITED STATES PATENT AND TRADEMARK OFFICE
CERTIFICATE OF CORRECTION

PATENT NO.   : 6,421,664 B1
DATED        : July 16, 2002
INVENTOR(S)  : Michael John Groeschel, Scott Dennis Helt and Rebecca Nan Brady Legler It is certified that error appears in the above-identified patent and that said Letters Patent is hereby corrected as shown below:

<u>Title page,</u>
Item [75], "Micahel" should be -- Michael --.

Signed and Sealed this

Twenty-ninth Day of October, 2002

*Attest:*

JAMES E. ROGAN
*Attesting Officer*          *Director of the United States Patent and Trademark Office*